United States Patent
Molaug

[11] Patent Number: 5,978,315
[45] Date of Patent: Nov. 2, 1999

[54] FEED WASTE DETECTOR

[75] Inventor: Ole Molaug, Bryne, Norway

[73] Assignee: Akva AS, Norway

[21] Appl. No.: 08/836,728
[22] PCT Filed: Nov. 8, 1995
[86] PCT No.: PCT/NO95/00209
§ 371 Date: Aug. 19, 1997
§ 102(e) Date: Aug. 19, 1997
[87] PCT Pub. No.: WO96/15663
PCT Pub. Date: May 30, 1996

[30] Foreign Application Priority Data

Nov. 10, 1994 [NO] Norway ................................. 944276

[51] Int. Cl.$^6$ .......................... A01K 61/02; G01S 15/96
[52] U.S. Cl. ................................ 367/90; 367/89; 367/94
[58] Field of Search ................................ 367/87, 89, 90, 367/93, 94, 908; 73/290 V

[56] References Cited

U.S. PATENT DOCUMENTS

| | | |
|---|---|---|
| 3,123,798 | 3/1964 | Holloway et al. . |
| 3,231,852 | 1/1966 | Kritz . |
| 3,757,286 | 9/1973 | Richard . |
| 3,761,909 | 9/1973 | Schweitzer et al. ....................... 367/94 |
| 3,805,224 | 4/1974 | Wenz ........................................ 367/93 |
| 3,867,719 | 2/1975 | Perrin ....................................... 367/94 |
| 3,879,697 | 4/1975 | Richard .................................... 367/94 |
| 4,901,245 | 2/1990 | Olson et al. ............................ 367/908 |

FOREIGN PATENT DOCUMENTS

| | | |
|---|---|---|
| 444881 | 5/1986 | Svalbard/Jan Mayen . |
| WO 92/12628 | 8/1992 | WIPO . |

OTHER PUBLICATIONS

Akustisk Malning Av Fiskefor, Tone Berg, Bentech A/S, pp. 4, 6, 24, 34, 36.

Primary Examiner—Ian J. Lobo
Attorney, Agent, or Firm—Douglas J. Christensen

[57] ABSTRACT

A method and a device for detecting fodder waste/loss within a fish enclosure (1), where a sound transmitter (4) and a hydrophone (6) are disposed as an upwardly directed echo sounder close to the bottom of the enclosure (1). Sound echoes from objects situated above the sound transmitter (4), are picked up by the hydrophone (6). A measuring unit (8) separates signals from the hydrophone (6) into various frequency bands close to the transmitted sound frequency. The distance and amount of the objects are determined in a way similar to the one used in echo sounders. Sinking objects will cause rejected sounds having frequencies slightly higher than the transmitted frequency, so called Doppler effect, and the frequency difference is a measure of the sinking speed of the object. An analyzing unit (10) emphasizes frequencies corresponding to a characteristic sinking speed for the actual type of fodder (2) and gives signals about fodder waste/loss when a predetermined minimum amount of objects having the characteristic sinking speed are detected within a predetermined distance area.

3 Claims, 1 Drawing Sheet

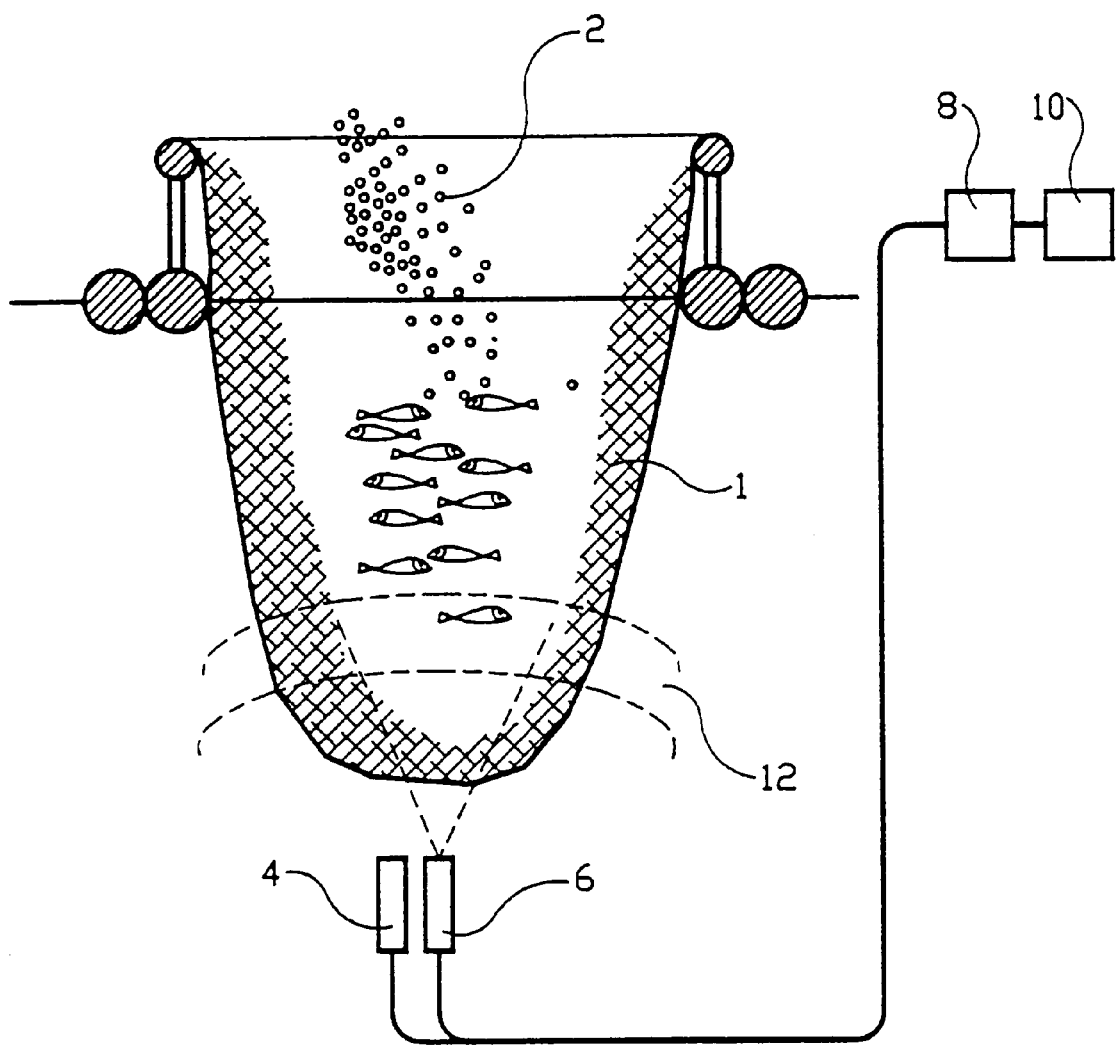

FEED WASTE DETECTOR

The invention relates to a method and a device for detecting fodder loss and waste in connection with the breeding of fish.

Fodder loss and waste represent great losses of value in the breeding of fish and, moreover, fodder loss and waste result in pollution. It is important to the breeder to utilize the growth potential of the fish as good as possible, and to achieve this, the allottment of fodder must be close to maximum. External environmental changes, e.g. the seeping in of colder water, may rapidly reduce the appetite of the fish, thus causing excess feeding, resulting in fodder loss and waste, especially when automatic feeding machines are used. It is known to control the feeding in relation to water temperature and other factors, but these measures have not been sufficient to avoid waste and loss of fodder. One has tried to measure the appetite of the fish as a function of its activity and reaction to feeding, but this approach has not given a satisfactory result either. Therefore, a need for a device capable of detecting fodder loss and waste directly in order to reduce the supply of fodder, has existed since a long time ago.

Several devices for detecting waste and loss of fodder have been tried out. A known detecting device utilizes an echo sounder principle combined with a computer analyzing a relatively complex echo sounder image, but this device has not spread, firstly because it is too expensive and secondly because it does not give a reliable detection. The pollution problem was reduced upon the arrival of devices collecting fodder not eaten. Such devices for collecting fodder comprises a bag which is attached beneath the "fence" enclosing the fish. Also, it is known to dispose risers with gas lift or other form of pumping for transferring the fodder from the collecting bag to the surface. The equipment makes it difficult to work with the enclosure in connection with the daily operation of the breeding plant. Moreover, the collecting bags are less efficient in areas where currents are frequent. Due to the loss of the nutritive value arisen when the fodder has been staying in water for some time, this collected fodder was seldom used a second time and, thus, the fodder loss and waste still represent an economic loss for the breeder, even in cases where pollution is reduced.

The object of the invention is to provide a method and a device for detecting loss and waste of fodder.

The object is obtained through features as defined in the following claims.

An exemplary embodiment of the invention is described in the following with reference to the attached drawing. In the FIGURE, reference numeral 1 denotes a floating enclosure for fish, fodder being supplied from above. In the bottom or close to the bottom of the enclosure 1, possibly beneath the enclosure if it has a net bottom, a sound transmitter 4 and a hydrophone 6 have been disposed, both connected to an electronic measuring unit 8 and an electronic analyzing unit 10.

The measuring unit 8 is adapted to drive the sound transmitter 4, such that sound waves are transmitted in a similar way as known from echo sounders. The sound waves are substantially directed upwardly. The hydrophone 6 is adapted to pick up sound waves within a frequency band comprising the sound frequency transmitted from the sound transmitter 4. The measuring unit 8 is adapted to separate the sound received by the hydrophone 6 into different frequencies and to transfer information concerning existing frequencies to the analyzing unit 10.

Fodder, fish and other objects occupying positions above the sound transmitter 4, will reflect some of the transmitted sound energy picked up by the hydrophone 6 in a manner corresponding to that of an echo sounder. Objects moving in a direction towards or away from the sound transmitter 4, i.e. vertically, will additionally cause a change of frequency, the socalled Doppler effect. Thus, the frequency distribution of the received sound signal becomes a measure of vertical movement of objects located above the sound transmitter 4.

Fish fodder has a characteristic speed of sinking, frequently very low, and the analyzing unit 10 is adapted to react to frequencies correspondingly above the sound frequency transmitted by the sound transmitter 4. The analyzing unit 10 which advantageously can be realized by means of microprocessor electronics, is adapted to weigh the intensity of the existing sound frequencies and, on the basis thereof, to give a signal about fodder loss/waste upon a predetermined occurence of frequencies higher than the sound frequency transmitted.

In order to avoid that sinking fodder close to the surface causes the development of a signal about fodder waste/loss, the analyzing unit 10 can advantageously be adapted to react only to sound waves reflected from objects located within a restricted area 12 from the hydrophone 6. As known per se, the distance is measured by measuring the running time for the sound from the sound transmitter 4. By measuring the occurence of sinking objects at several distances from the hydrophone 6, the analyzing unit 10 can compute how large a share of the fodder supplied to the fish that has been lost and, thus, give a graded signal to the automatic feeding machine, which can reduce the allottment of fodder correspondingly.

In the exemplary embodiment, the sound transmitter 4 and the hydrophone 6 are positioned below the enclosure 1, and the hydrophone 6 is adapted to react to approaching fodder particles. In connection with floating fodder which is allotted from below, the sound transmitter 4 and the hydrophone 6 can be directed downwardly and be positioned adjacent the surface. Of course, it is also possible to adapt the analyzing unit 10 to react to objects moving away from the hydrophone 6, and to position the sound transmitter 4 and the hydrophone 6 accordingly. In areas subjected to strong current, it may be necessary to place, the sound transmitter 4 and the hydrophone 6 such that the fodder will be moving as straight as possible towards the hydrophone 6 or as straight as possible away from the same. If the current direction is varying, it might be necessary to dispose several sound transmitters 4 and/or a plurality of hydrophones 6, and to read the one or the ones best suited according to the current direction prevailing at the moment.

Normally, the sound transmitter 4 and the hydrophone 6 will be built together forming one unit. Information may, if desired, be transferred wirelessly between the measuring unit 8 and the sound transmitter 4 respectively the hydrophone 6 by means of sound signals or electromagnetic signals having an appropriate frequency, including light and radio waves.

I claim:

1. A method for detecting fodder loss in fish enclosures immersed in water, wherein a sound transmitter and a sound receiver are positioned proximate the bottom of the enclosure and are upwardly directed, comprising the steps of:
   a) transmitting sound waves upwardly by said sound transmitter;
   b) receiving downwardly reflected sound waves from objects, including fodder, in said enclosure by said sound receiver;
   c) separating said reflected received sound waves into a plurality of frequency components;

d) analyzing said frequency components to determine whether the objects reflecting said sound wave frequency components are moving toward or away from said sound receiver; and e) analyzing said frequency components to evaluate the rate of movement of objects toward said sound receiver, and thereby to identify and evaluate the amount of fodder loss through sinking in said enclosure.

2. The method of claim 1, wherein the steps of transmitting and receiving further comprise analysis of reflected sound wave frequencies originating from within a specified distance.

3. A combination of a fish enclosure immersed in water and apparatus for detecting fodder loss in the fish enclosure, said enclosure having a feeding area and a restricted area below said feeding area, the apparatus comprising:

a) a sound transmitter positioned beneath said restricted area of said enclosure and adapted for transmitting sound waves at a predetermined frequency toward said restricted area, whereby fodder particles falling in said restricted area at a characteristic speed reflect said sound waves toward the sound transmitter at a characteristic frequency;

b) a sound receiver proximate the sound transmitter and configured for receiving said sound waves directed by said sound transmitter and reflected from said fodder particles; and c) an analyzer in electronic communication with said sound receiver, said analyzer configured to detect sound waves having the characteristic frequency and to generate an output signal related to the intensity of the sound waves having the characteristic frequency, whereby the fodder loss can be determined.

* * * * *